(12) United States Patent
Wiedemeier et al.

(10) Patent No.: US 9,092,213 B2
(45) Date of Patent: Jul. 28, 2015

(54) FUNCTIONAL UNIT FOR VECTOR LEADING ZEROES, VECTOR TRAILING ZEROES, VECTOR OPERAND 1S COUNT AND VECTOR PARITY CALCULATION

(75) Inventors: Jeff Wiedemeier, Austin, TX (US); Sridhar Samudrala, Austin, TX (US); Roger Golliver, Beaverton, OR (US); Eric W. Mahurin, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 12/890,457

(22) Filed: Sep. 24, 2010

(65) Prior Publication Data

US 2012/0079253 A1    Mar. 29, 2012

(51) Int. Cl.
*G06F 7/38* (2006.01)
*G06F 9/00* (2006.01)
*G06F 9/44* (2006.01)
*G06F 15/00* (2006.01)
*G06F 9/30* (2006.01)

(52) U.S. Cl.
CPC ........ *G06F 9/30036* (2013.01); *G06F 9/30014* (2013.01); *G06F 9/30018* (2013.01)

(58) Field of Classification Search
None
See application file for complete search history.

(56) References Cited

U.S. PATENT DOCUMENTS

| 4,849,923 | A |   | 7/1989  | Samudrala et al. |        |
|-----------|---|---|---------|------------------|--------|
| 4,852,039 | A |   | 7/1989  | Maheshwari et al.|        |
| 5,317,527 | A |   | 5/1994  | Britton et al.   |        |
| 5,341,319 | A | * | 8/1994  | Madden et al.    | 708/503|
| 5,784,305 | A |   | 7/1998  | Nadhara          |        |
| 5,928,316 | A |   | 7/1999  | Wong et al.      |        |
| 5,991,531 | A |   | 11/1999 | Song et al.      |        |
| 5,993,051 | A | * | 11/1999 | Jiang et al.     | 708/501|
| 6,058,465 | A |   | 5/2000  | Nguyen           |        |
| 6,078,941 | A |   | 6/2000  | Jiang            |        |
| 6,256,655 | B1| * | 7/2001  | Ezer et al.      | 708/501|
| 6,292,886 | B1|   | 9/2001  | Makineni et al.  |        |
| 6,321,327 | B1|   | 11/2001 | Makineni et al.  |        |
| 6,324,638 | B1|   | 11/2001 | Elmer et al.     |        |
| 6,360,241 | B1|   | 3/2002  | Matson et al.    |        |
| 6,366,942 | B1|   | 4/2002  | Badeau et al.    |        |
| 6,378,067 | B1|   | 4/2002  | Golliver et al.  |        |
| 6,401,194 | B1|   | 6/2002  | Nguyen et al.    |        |
| 6,480,872 | B1|   | 11/2002 | Choquette        |        |
| 6,564,239 | B2|   | 5/2003  | Matson et al.    |        |

(Continued)

FOREIGN PATENT DOCUMENTS

TW          200929062 A       7/2009

OTHER PUBLICATIONS

"A Practitioner's Guide to Adjusted Peak Performance," U.S. Dept. of Commerce Bureau of Industry & Security, Dec. 2006, 32 pages.

(Continued)

*Primary Examiner* — Corey S Faherty
(74) *Attorney, Agent, or Firm* — Nicholson De Vos Webster & Elliot LLP

(57) ABSTRACT

A method of performing vector operations on a semiconductor chip is described. The method includes performing a first vector instruction with a vector functional unit implemented on the semiconductor chip and performing a second vector instruction with the vector functional unit. The first vector instruction is a vector multiply add instruction. The second vector instruction is a vector leading zeros count instruction.

19 Claims, 9 Drawing Sheets

(56) References Cited

U.S. PATENT DOCUMENTS

| | | |
|---|---|---|
| 6,578,059 B1 | 6/2003 | Huck et al. |
| 6,732,135 B1 | 5/2004 | Samudrala et al. |
| 6,779,012 B2 | 8/2004 | Matson et al. |
| 7,127,483 B2 | 10/2006 | Beaumont-Smith et al. |
| 7,225,323 B2 | 5/2007 | Sui et al. |
| 7,315,163 B2 | 1/2008 | Takeuchi |
| 8,046,399 B1 * | 10/2011 | Inaganti et al. ............... 708/501 |
| 8,356,144 B2 | 1/2013 | Hessel et al. |
| 2004/0142717 A1 | 7/2004 | Schmidt et al. |
| 2007/0074008 A1 * | 3/2007 | Donofrio ...................... 712/222 |
| 2007/0198815 A1 | 8/2007 | Liu et al. |
| 2008/0275931 A1 | 11/2008 | Schmoker |
| 2008/0294871 A1 | 11/2008 | Pappalardo et al. |
| 2009/0063608 A1 | 3/2009 | Mejdrich et al. |
| 2009/0106526 A1 | 4/2009 | Luick et al. |
| 2009/0150647 A1 | 6/2009 | Mejdrich et al. |
| 2009/0182987 A1 | 7/2009 | Mejdrich et al. |
| 2009/0182990 A1 | 7/2009 | Muff et al. |
| 2010/0031009 A1 | 2/2010 | Muff et al. |
| 2010/0063985 A1 * | 3/2010 | Boersma et al. ............... 708/211 |
| 2011/0145543 A1 | 6/2011 | Damron |
| 2011/0231460 A1 | 9/2011 | Ahmed |
| 2011/0298788 A1 | 12/2011 | Hickey et al. |
| 2011/0320765 A1 | 12/2011 | Karkhanis et al. |
| 2012/0079250 A1 | 3/2012 | Pineiro et al. |

OTHER PUBLICATIONS

Carrier, John, "HPCS I/O, Lustre Users Group," Cray, Inc., Apr. 28, 2008, 21 pages.

Erickson, Jonathon, "AMD's x86 SSE5 Extensions," Copyright © 2007, CMP Technology, 2 pages.

"SSE5," from Wikipedia, Oct. 9, 2010 at 21:21, 3 pages.

McFarlin, Daniel, et al., "Automatic Generation of Vectorized Fast Fourier Transform Libraries for the Larrabee and AVX Instruction Set Extension," Proceedings of High Performance Embedded Computing (HPEC), 2009, 2 pages.

Vector Processors, Architecture of Parallel Computers, 1976-1996, 12 pages.

Office Action from co-pending Taiwan Patent Application No. 100133947, mailed Dec. 4, 2013, 19 pages including English Translation.

"AMD64 Architecture Programmer's Manual, vol. 6: 128-Bit and 256-Bit XOP and FMA4 Instructions", Publication No. 43479, Revision 3.04, Date Nov. 2009, 276 pages.

Espasa, Roger, "Tarantula: A Vector Extension to the Alpha Architecture", Proceedings of the 29th Annual International Symposium on Computer Architecture, 2002, 12 pages.

"Packed Multiply Accumulate Signed High Doubleword to Signed Quadword," AMD64 Technology, 43479-Rev. 301, PMACSDQH Instruction Reference, Aug. 2007, pp. 160-165.

PCT/US2011/052889 International Search Report and the Written Opinion of the Search Authority, mailed May 3, 2012, 5 pages.

PCT/US2011/052899 International Search Report and the Written Opinion of the Search Authority, mailed Apr. 24, 2012, 8 pages.

* cited by examiner

__US 9,092,213 B2__

FUNCTIONAL UNIT FOR VECTOR LEADING ZEROES, VECTOR TRAILING ZEROES, VECTOR OPERAND 1S COUNT AND VECTOR PARITY CALCULATION

FIELD OF INVENTION

The field of invention relates generally to computer systems, and, more specifically, to a processor architecture for performing a vector multiply add instruction and other instructions that use logic blocks used to calculate the vector multiply add result.

BACKGROUND

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 1A and 1B present a comparative example that demonstrates the basic difference between a scalar processor and a vector processor.

FIG. 1A shows an example of a scalar AND instruction in which a single operand set, A and B, are ANDed together to produce a singular (or "scalar") result C (i.e., AB=C). By contrast, FIG. 1B shows an example of a vector AND instruction in which two operand sets, A/B and D/E, are respectively ANDed together in parallel to simultaneously produce a vector result C, F (i.e., A.AND.B=C and D.AND.E=F).

As is well known in the art, typically, both input operands and output result are stored in dedicated registers. For example, many instructions will have two input operands. Therefore two distinct input registers will be used to temporarily store the respective input operands. Moreover, these same instructions will produce an output value which will be temporarily stored in a third (result) register. Respective input 101a,b and 102a,b and result registers 103a,b are observed in FIGS. 1A and 1B. Notably, the "scalar" vs. "vector" characterizations are readily discernible.

That is, input registers 101a and 102a of the scalar design of FIG. 1A are observed holding only scalar values (A and B, respectively). Likewise, the result register 103a of the scalar design of FIG. 1A is also observed holding only a scalar value (C). By contrast, the input registers 101b and 102b of the vector system of FIG. 1B are observed holding vectors (A,D in register 101b and B,E in register 102b). Likewise, the result register 103b of the vector system of FIG. 1B is also observed holding a vector value (C,F). As a matter of terminology, the contents of each of the registers 101b, 102b and 103b of the vector system of FIG. 1B can be globally referred to as a "vector", and, each of the individual scalar values within the vector can be referred to as an "element". Thus, for example, register 101b is observed to be storing "vector" A, D which is composed of "element" A and "element" D.

Only scalar or SIMD multiply operations are known to have been actually implemented in a semiconductor chip processor as a single processor instruction. Scalar or SIMD multiply instructions that are known to have been implemented in a semiconductor chip processor include the "multiply" instruction (MUL) which provides the lower ordered bits of the product of two integer input operands and the "multiply high" instruction (MULH) which provides the higher ordered bits of a scalar integer multiply operation.

Other instructions that are known to have been implemented in a semiconductor processor chip as scalar or SIMD instructions include the "count leading zeros" CLZ instruction, the "count trailing zeroes" instruction CTZ, and the "count" instruction CNT. The scalar CLZ instruction accepts a scalar input A and returns the number of 0s in A that precede the highest ordered 1 in A (e.g., if A=1000, the result of CLZ=0; if A=0100; the result of CLZ=1, if A=0010, the result of CLZ=2;, etc.). The scalar CTZ instruction accepts a scalar input A and returns the number of 0s in A that follow the lowest ordered 1 in A (e.g., if A=1000, the result of CTZ=3; if A=0100; the result of CTZ=2, if A=0010, the result of CTZ=1;, etc.). The scalar CNT instruction accepts a scalar input A and returns the number of 1s in A (e.g., if A=1011, the result of CLZ=3; if A=1001; the result of CLZ=2, if A=0010, the result of CLZ=1;, etc.).

FIGURES

The present invention is illustrated by way of example and not limitation in the figures of the accompanying drawings, in which like references indicate similar elements and in which.

DETAILED DESCRIPTION

Figure 1A:
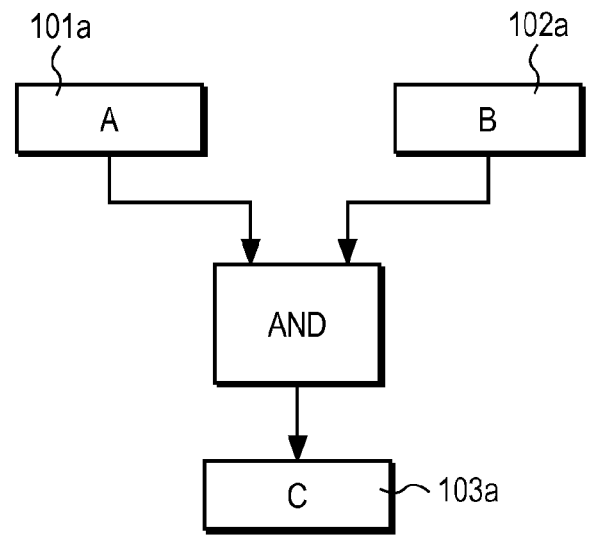
FIGS. 1a and 1b show scalar and vector logic operations.
Figure 1B:
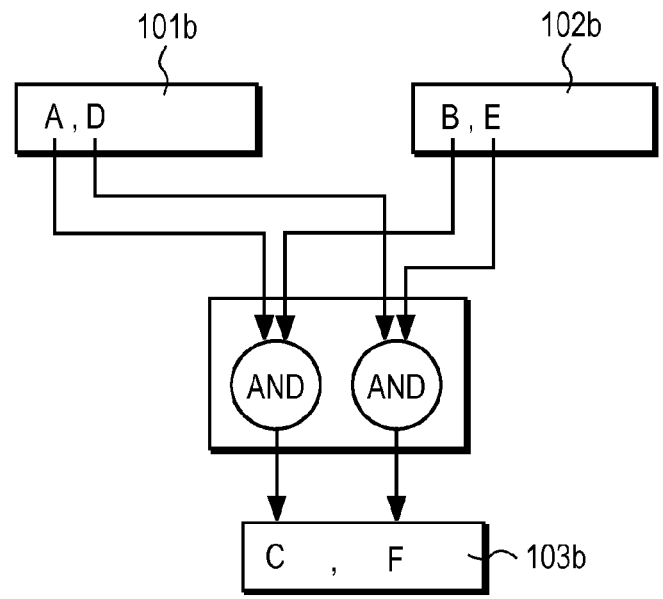
Figure 2:
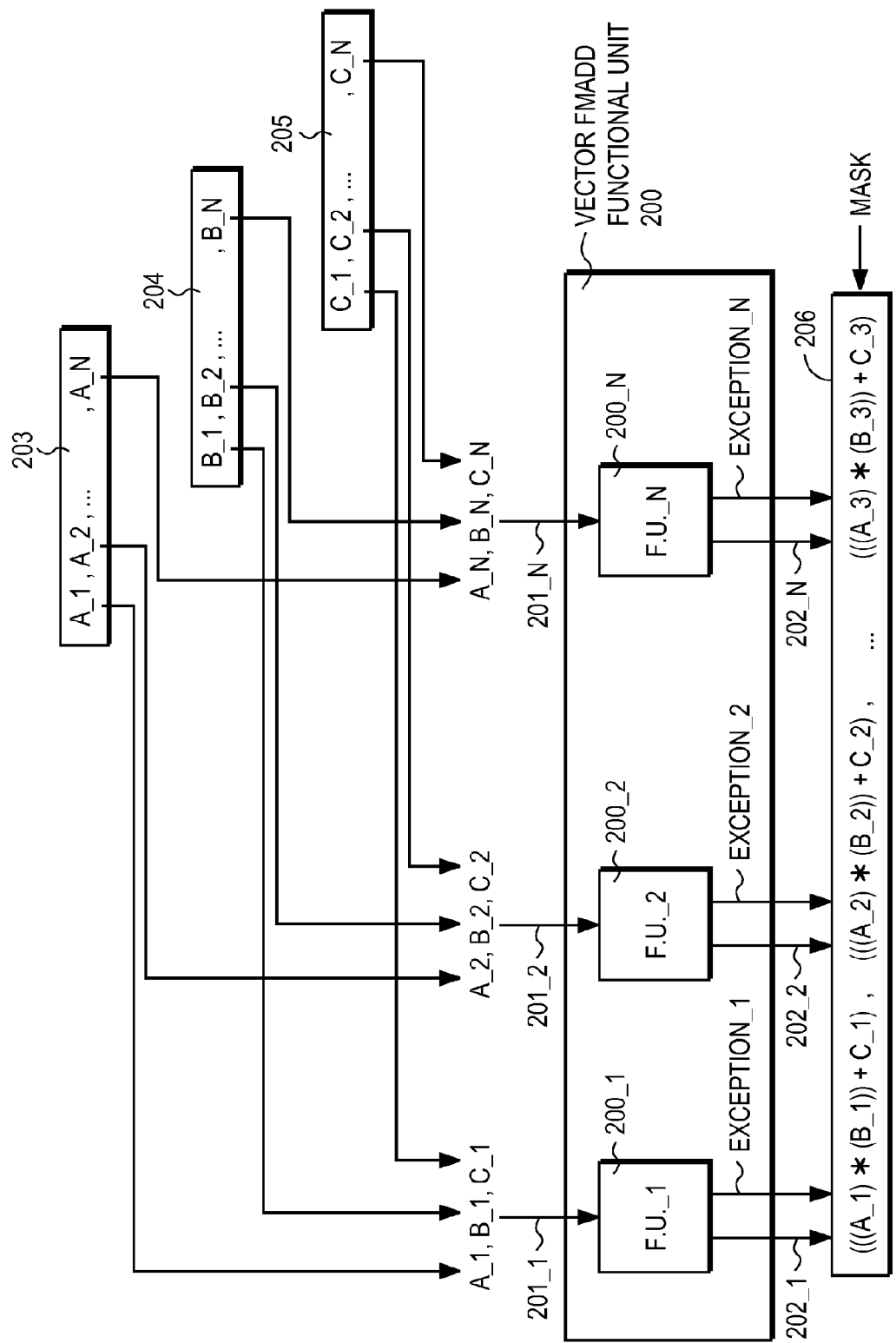
FIG. 2 shows a vector multiply add functional unit.

Some computer systems may require a "multiply add" operation. A multiply add operation carries out the calculation (A*B)+C where each of A, B and C are input operands. FIG. 2 shows a high level architectural view of a vector processing functional unit 200 that is capable of performing a vector multiply add instruction (VMADD). As observed in FIG. 2, the functional unit includes N scalar logic units 200_1 through 200_N that each perform a scalar multiply add operation on respective elements of the input vectors. Here, input register 203 holds input vector A=A_1, A_2, ... A_N; input register 204 holds input vector B=B_1, B_2, ... B_N; and, input register 205 holds input vector C=C_1, C_2, ... C_N. Scalar logic unit 200_1 performs the calculation ((A_1)*(B_1))+C_1; scalar logic unit 200_2 performs the calculation ((A_2)*(B_2))+C_2; ...; and, scalar logic unit 200_N performs the calculation ((A_N)*(B_N))+C_N. In an embodiment, each scalar logic unit supports both a 32 bit operand operating mode and a 64 bit operand operating mode. The individual results 202_1 through 202_N produced by logic units 200_1 through 200_N correspond to the individual elements of the output vector provided by the vector functional unit 200 which is stored in an output register.

FIG. 2 also shows that, in order to effect vector operations as opposed to SIMD operation, a masking layer may be incorporated into the output circuitry 206. Vector operation can be viewed as being distinctive from SIMD operation in the sense that the dimension of the input operand is variable for vector machines but is fixed for SIMD machines. The ability to vary the number of elements in the vector machine of FIG. 2 is represented by way of the masking that can be performed at output 206. Specifically, each output element may be written to with its own respective write logic circuitry (not shown). In an embodiment, the write logic circuitry can write to any output element location. By enabling the write logic circuitry only for those elements that correspond to a valid vector operand element, variable length vectors can be processed. This has the effect of essentially enabling for operation only those of scalar functional units 200_1 through 200_N that correspond to a valid vector element. Furthermore, the mask enables any arithmetic exceptions detected for the valid elements to be presented, while, suppressing exceptions for the inactive elements.

As will be described in further detail below, apart from calculating a vector multiply add instruction, functional unit 200 is also capable of calculating a number of additional vector instructions such as one or more of the following: i) a vector multiply add high instruction (VMADDH) for integer operands which provides the higher ordered bits of the vector multiply add calculation; ii) a vector multiply add (VMADDL) for integer operands which provides the lower ordered bits of the vector multiply add calculation; iii) a vector count leading zeroes instruction (VCLZ) which accepts an input vector C and provides as a result an output vector whose elements respectively correspond to the leading zero count of the elements of input vector C; iv) a vector count trailing zeroes instruction (VCTZ) which accepts an input vector C and provides as a result an output vector whose elements respectively correspond to the trailing zero count of the elements of input vector C; v) a vector count instruction (VCNT) which accepts an input vector C and provides as a result an output vector whose individual elements respectively correspond to a count of 1s within the individual elements of input vector C; and, vi) a vector parity instruction (VPAR) which accepts an input vector C and provides as a result an output vector whose individual elements respectively correspond to the parity status (odd or even) of the individual elements of input vector C. As with the VMADD instruction, each of the instructions enumerated above are accomplished by the scalar execution of respective input operand elements of vector inputs A, B and C. In further embodiments, again as described in more detail below, any/all of the instructions executed by functional unit 200 are operable on floating point as well as integer operands.

Figure 3:
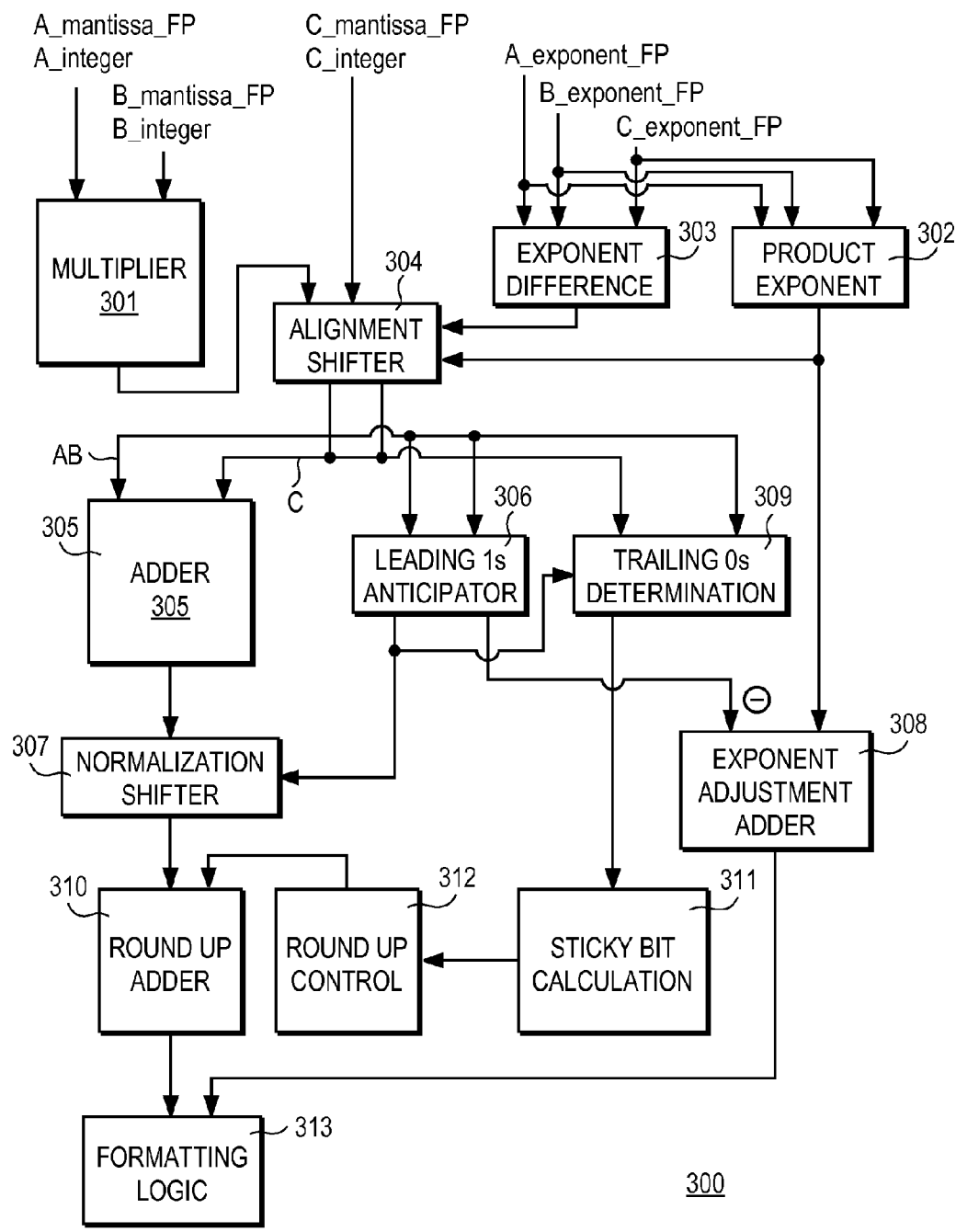
FIG. 3 shows an embodiment of an electronic functional unit that can be used for each of functional units 200_1 through 200_N of FIG. 2.

FIG. 3 shows an embodiment of one of the scalar logic units of FIG. 2. As described presently, the scalar logic unit is capable of performing a scalar operation on respective elements of input vectors A, B and C in support of any of the aforementioned VMADD, VMADDH, VMADDL, VCLZ, VTLZ, VCNT and VPAR instructions.

Operation of the VMADD instruction when the elements of input vectors A, B, C and the elements of output vector R are specified in floating point form will be presently described. As is known the art, articulation of a numerical value in floating point takes the form of (sign)*(mantissa)*(exponent) where the sign value indicates whether the numerical value is positive or negative, the mantissa value specifies the "number" of the value, the exponent value specifies the order of the value. The VMADD instruction can then be specified as follows ((A_sgn)(B_sgn)(A_mantissa)(B_mantissa)(A_exponent+B_exponent))+(C_sgn)(C_mantissa)(C_exponent).

Referring to FIG. 3, multiplier 301 calculates the (A_sgn)(B_sgn)(A_mantissa)(B_mantissa) term as an explicit calculation of (A_mantissa)(B_mantissa) at least. The sign of the product can be easily calculated as: i) positive if A_sgn and B_sgn have the same value; or, ii) negative if A_sgn and B_sgn have different values. Product exponent block 302 determines an initial calculation of the exponent for the final result by taking the greater of: i) (A_exponent+B_exponent); and, ii) C_exponent. That is, if the C value is much larger than the product of A and B, the order of the C term will control the order of the final result. Likewise, if AB is much larger than C then the order of AB will control the order of the final result.

Adder 305 performs the addition of the AB+C calculation. Notably however, before the addition can be performed in floating point form, in an embodiment, the exponent of the AB term (that is, the exponent associated with the output of multiplier 301) is made to be the same the exponent of the C term. Exponent difference block 303 and shifter 304 are used to effect this process. Specifically, exponent difference block 303 takes the difference between the exponent of the AB term and the exponent of the C term (i.e., the difference between: i) (A_exponent+B_exponent); and, ii) C_exponent). The smaller of the two terms is also identified (e.g., by analyzing the output of the product exponent block 302). The binary point position of the mantissa of the smaller of the two terms, that is, the binary point position of the mantissa of the AB product term or the C term—whichever has the smaller exponent term—is then shifted "to the left" a number of bit positions that corresponds to the exponent difference between the two terms as determined by the difference block 303. The shifted term and the other, non shifted term are passed to the adder 305.

As an example, if the AB product term corresponds to 5.5555E8 and the C term corresponds to 2.2222E6, the binary point position of the mantissa of the C term (2.2222) will be shifted to the left by two places (0.02222) by shifter 304 so that the adder 305 can properly add the mantissas of two numbers having the same exponent value. In this example, the adder 305 will properly add 5.5555E8 and 0.02222E8. Thus, in an embodiment, the shifter 304 is coupled to the output of the difference block 303 to determine the proper amount of shift to be applied to the binary point position of the mantissa of one of the AB term and the C term. In a further embodiment, the binary point position of the mantissa of one of the AB and C terms is shifted while the other is not shifted. The shifted mantissa value and the non shifted mantissa value are then presented to adder 305. Of course, in a situation where the difference block 303 determines that the exponents of the AB term and the C term are the same, no shift is performed and the mantissas of both the AB term and the C term pass to the adder 305 unshifted.

In an embodiment, the sign values of the AB term and the C term are also passed to the adder 305 so that, for instance, if the sign of the C term is negative, the effective subtraction AB−C is properly performed. In the case of effective subtraction between the two terms (i.e., when the sign of the AB term is different than the sign of the C term) and the absolute value of the two terms are approximately equal, the output of the adder 305 may be a number that is close to zero. Hence, the mantissa value at the adder 305 output may have a string of leading 0s before the first 1 is observed. In this case, in order to produce a result of higher precision, the binary point of the mantissa value at the adder 305 output should be shifted to produce a mantissa having an integer as its first value.

For example, if the adder is presented with an AB mantissa and sign term of −5.555566 . . . and a C mantissa and sign term of +5.555555 . . . , the adder 305 will produce an output of −0.000011 . . . . In order to enhance the precision of the final result, the binary point of the result from the adder 305 should be shifted to the right 5 places to take the form of 1.111111 . . . . As the shifting to the right of the binary point corresponds to a change in exponent value, the exponent value will also need to change. In this particular example, shifting the mantissa binary point to the right 5 places corresponds to reducing the exponent value by 5. Therefore, when the mantissa term provided at the adder 305 output has leading zeroes, not only does its binary point need to be shifted to the right, but also, the exponent term at the output of the product exponent block 303 needs to be reduced. Here, the leading 1s anticipator block 306, normalization shifter 307 and exponent adder 308 are used to accomplish these tasks.

Specifically, the leading 1s anticipator 306 flags the position of the first (leftmost) 1 in the adder output, and, indicates to the normalization shifter 307 how many binary points the adder output should be shifted to the right, and, indicates to the exponent adder 308 how much the exponent value from exponent block 302 should be reduced. In an embodiment, the moving of the binary point of the adder output to the right is actually accomplished by moving the numerical content of the adder output to the left. In the same or other embodiments, the adder 308 understands that the value arriving from the leading 1s anticipator 306 is to be subtracted from the product exponent 302 output value.

In an embodiment, the leading 1s anticipator operates as follows. Of the two input operands that are provided to the adder 305 (i.e., the mantissa of the AB term and the mantissa of the C term), the leading 1s anticipator 306 determines the leading 1 position in both of these terms individually and flags the leftmost bit position of the pair of leading 1 positions. For example, if the mantissa of the AB term is 0001100101 . . . and the mantissa of the C term is 0000100000 . . . , the leading 1s anticipator 306 will flag the fourth bit position because the fourth bit position (of the AB mantissa term) is the leftmost (or highest ordered) leading 1 amongst the two operands. This determination is then assumed to be the leading 1 position of the adder 305 output. In many cases this assumption will be correct and is used to determine the adder output shift amount performed by normalization shifter 307 and the exponent reduction amount performed by adder 308.

In some cases the assumption will not be correct. The two operands provided in the example just above will be added by the adder to produce an adder output of 0010000101 . . . . In cases where the assumption is incorrect, as in the present example, the addition of the two operands causes a carry term at the bit position identified by the leading 1s anticipator (i.e., the bit position of the adder output identified by the leading 1s anticipator is a 0), and, therefore, the bit position one position to the left of the position identified by the leading 1s anticipator is a 1. As such, in an embodiment, before releasing the assumed value flagged by the leading 1s indicator 306 as the amount by which the adder output should be shifted and its exponent reduced, logic circuitry performs either or both of the following as a "check": i) see if the position of the adder 305 output identified by the leading 1s indicator is a 0; ii) see if the position of the adder 305 output just to the left of the position identified by the leading 1s indicator is a 1. If either of these conditions are true then the correct answer is not the bit position flagged by the leading 1s indicator 306 but the bit position just to the left of the bit position flagged by the leading 1s indicator. In this case, the leading 1s indicator will essentially correct its assumption and provide correct information to shifter 307 and adder 308.

Here it is worthwhile to note that a reason why a leading 1s anticipator is used is that the process of determining a leading 1s position is somewhat comprehensive and may consume one or more clock cycles. Likewise the addition performed by adder 305 is also somewhat comprehensive and may consume one or more clock cycles. If the leading 1s determination was configured to "follow" the adder 305, two or more clock cycles would be consumed to determine the summation of AB+C and the leading 1 position of the summation. With the architecture observed in FIG. 3, however, the summation of adder 305 and the leading 1s determination of anticipator 306 are largely made in parallel thereby reducing the total consumed clock cycle time as compared to the serial approach. Moreover, even though the result of the leading 1s anticipator 306 may be wrong and therefore is checked, the "check" operation described above is relatively simple and the logic used to carry it out is relatively short end-to-end such that the time penalty of the check operation is acceptable and therefore maintains a better overall solution.

Once the shifter 307 has shifted the result of adder 305 and adder 308 has reduced the exponent value (if any such shift and exponent reduction is applicable), the "answer" of the FMADD instruction (AB+C) has essentially been determined. Final processing is performed to articulate its answer with the desired precision and appropriate format. Part of this processing includes rounding the mantissa value. In an embodiment, the instruction can specify either of two different levels of precision: single precision or double precision. In a further embodiment, the double precision value is articulated with twice (or approximately twice) the number of bits that the single precision value is articulated with. In a further embodiment, the single precision format is 32 bits composed of 1 bit for sign, 23 bits for mantissa and 8 bits for exponent, and, the double precision format is 64 bits composed of 1 bit for sign, 52 bits for mantissa and 11 bits for exponent. In an even further embodiment, internally to the functional unit 300, the mantissa is calculated with up to 128 bits of precision. Here, the output width of the multiplier 301 is wired as 128 bits to handle the integer multiplication of two 64 bit integer values. Likewise the adder 305 output and shifter 307 output are also 128 bits.

As such, in various embodiments, the number of bits that are internally calculated by the functional unit 300 for the mantissa of the result can exceed the number of bits that are actually presented as the mantissa of the final result. Thus, the rounding operation sees if any of the bits below the finally presented mantissa is a 1—this is referred to as a sticky bit. In the architecture of FIG. 3, a trailing zeroes logic block 309 determines the number of trailing zeroes in the output of shifter 307. This number when compared to the number of additional bits in the calculation by the functional 300 indicates if there is a 1 in the bits below the finally presented mantissa. If the mantissa is shifted left to eliminate the leading zeros while shifting zeros at the bottom, the number of additional trailing zeros, which is equal to the left shift amount calculated by the leading 1 block 306 needs to be taken into account. Here, in order to correctly calculate the number of trailing zeros in the output of shifter 307, the trailing zeros detector 309 should be aware of any shift imposed by the leading 1s anticipator 306, hence, the trailing zeros detector 309 is also observed accepting an input from the leading 1s anticipator 306.

The number of zeroes, starting from the least ordered (rightmost) bit position and moving to the left bit by bit to each next higher ordered bit position, is determined up to the location of the least significant (rightmost) value of 1. If the number of trailing zeros extends up to or beyond (to the left) of the least significant (rightmost) bit position of the mantissa for a given precision, the least significant bit position is kept at its present value (i.e., no round up takes place). Otherwise, i.e., a round up occurs, and the least significant bit position of the mantissa for the applicable precision is incremented: i)

from 0 to 1, or, ii) from 1 to 0 and a carry term arises that ripples up to the next higher bit position.

A round up an adder 310 is used to add a value of 1 to the least significant bit position of the result mantissa in shifter 307 for the applicable precision. The output of the adder 310 is taken as the final mantissa value subject to the desired precision. In an embodiment, the output of adder 310 is always taken as the final mantissa value subject to the desired precision, where, a value of 0 is effectively added to the shifter 307 output if no round up occurs and a value of 1 is added to the shifter 307 output at the rightmost position for the given precision if a round up does occur. As observed in FIG. 3, sticky bit calculation logic 311 determines whether or not a round-up is necessary based on the output of the trailing zeroes detection logic 309 and the desired precision, and, round-up control logic 312 provides a 0 or a 1 to the adder 310 at the least significant bit position for the desired precision depending on the sticky bit determination (0 is added in if no round-up is to take place, 1 is added in if a round-up is to take place).

Note that, in the embodiment of FIG. 3, the trailing zeroes detection logic 309 operates on the operands presented to adder 305 so that, like the leading 1s anticipator 306, it can operate in parallel with adder 305. In a further embodiment, the trailing zeroes detector identifies the least significant (rightmost) bit value of 1 in each operand and flags that least significant bit position amongst the two operands as the basis for determining the number of trailing zeroes in the output of adder 305. Any shifting induced by the leading 1s anticipator is also accounted for by the trailing zeroes detector 309. That is, for a given precision, any shifting of the adder 305 result will affect how many zeroes need to be detected before it is determined whether they extend up to or beyond the least significant bit of the shifter 307 output. Note that this approach for trailing zeroes detection does not require any "check" (as with the leading 1s anticipator) as there is no possibility (mathematically speaking) of an error.

The above description was written in view of a floating point calculation of the VMADD instruction. In the case of an integer VMADD instruction, integer operands are simply presented to the multiplier 301 input. Here, in an embodiment that supports 53 b double precision floating point mantissa calculations, the multiplier is designed to handle 64 b integer multiplication. As such, the multiplier output is 128 bits wide. In the case of 64 bit integer operation, in an embodiment, the C term is padded on the left with 64 zeros so that its least significant bit is aligned with the least significant bit of the multiplier 301 output. That is, the C term operand that is provided to adder 305 has 64 bits of zeros as its left half and the 64 bit C input operand as its right half. Since the embodiment supports calculation of 1 double precision or 64 b integers and 2 single precision or 2 32 b integer operations, for 32 b integers the upper half of each of the two C terms (each 32 b) are padded with zeros to make them 64 b wide In the case of 32 bit integer operation, the C term is padded appropriately. In an embodiment, the zero padding is effectively accomplished by shifting the C term to the right with shifter 304. In a further embodiment, for integer operation, the exponent difference block 303 is used to specify the amount of shift depending on the precision for the integer calculation. That is, for example, for 64 bit integer operation, the exponent difference block 303 is configured to send an input signal to shifter 304 that causes the shifter 304 to shift the C term 64 bits to the right; and, for 32 bit operation, the exponent difference block 303 is configured to send an input signal to shifter 304 that causes shifter 304 to shift the C term 96 bits to the right.

The adder 305 adds the multiplier output and shifted, aligned C term value to determine the integer value of AB+C. Because the size of the integer value of AB+C may exceed the permissible bit width of the final result, in an embodiment, the high half or the low half of the output of the adder 305 is passed as the final result by shifter 307. For example, in an embodiment where the output of adder 305 is 128 bits wide and 64 bit integer operation applies, the result of the instruction can only be 64 bits wide yet the internal functional unit calculates 128 bit integer values. As such, there exists two different VMADD instructions for integer operations: VMADDH and VMADDL. VMADDH presents the most significant 64 bits of the 128 bit adder output, and, VMADDL presents the least significant 64 bits of the 128 bit adder output. In the case of integer VMADD operation, the product exponent block 302, leading 1s anticipator 307, exponent adder 308, trailing zeros detector 309, sticky bit logic 311 and round-up control logic 312 are not used other than perhaps to add in an inconsequential zero to adder 310.

Figure 4A:
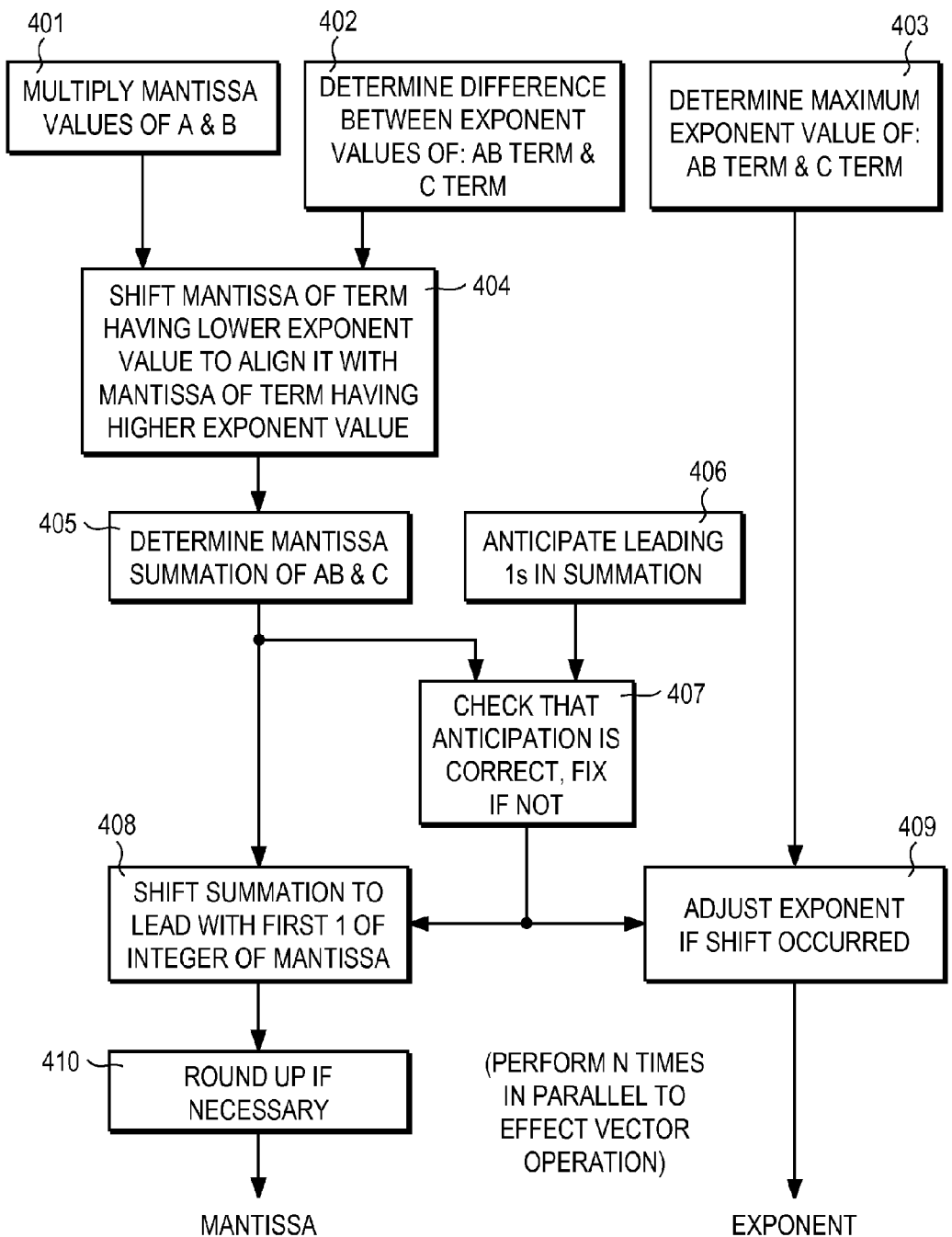
FIG. 4a shows a vector floating point multiply add operation.

FIG. 4a shows an embodiment of floating point VMADD operation of the functional unit as described above and FIG. 4b shows an embodiment of integer VMADDL/H operation of the functional unit as described above. Referring to FIG. 4a, the respective mantissa values for operands A and B are multiplied 401. Substantially in parallel, the difference between the exponent values of the AB term and the C term is determined 402 and the maximum of the AB term exponent and C term exponent is adopted as the initial exponent for the result 403. Based on the determined difference between the exponent of the AB and C terms, the mantissa of the term having the smaller exponent is shifted 404 to align with the mantissa of the term having the larger exponent. The aligned mantissas of the AB and C terms are then added 405. Substantially in parallel, the leading 1s of the adder result are anticipated 406. The anticipation of leading 1s is checked 407 against the summation result of AB+C. Based on the leading 1s determination, the result of the mantissa summation of AB+C is shifted to lead with an integer value 408 and the exponent result for the instruction is adjusted 409. A round up is performed if necessary 410 and the mantissa value is presented based on the specified precision.

Figure 4B:
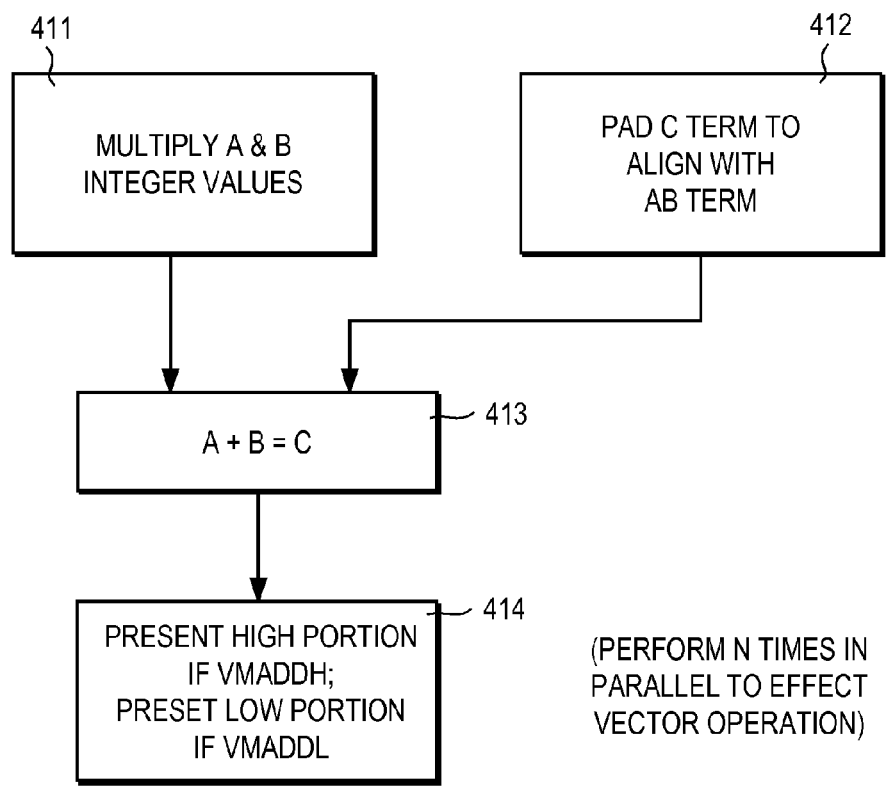
FIG. 4b shows a vector integer floating point operation.

Referring to FIG. 4b, the integer A and B terms are multiplied 411 and the C term is padded 412 to align with the AB product. The AB and C integer terms are added 413. If the instruction specifies the high portion the high portion of AB+C is presented, or, if the instruction specifies the low portion the low portion of AB+C is presented. Note that executing VMADDH consecutively with VMADDL and storing the results in separate places permits the system to keep the total value for AB+C.

It is worthwhile repeating that the above description of functional unit 300 describes a functional unit that can be instantiated multiple times in a vector functional unit so that vector multiply add instructions (VMADD) are performed.

The functional unit 300 of FIG. 3 can also be enhanced to perform a scalar component of any one or more of the following instructions: i) a vector count leading zeroes instruction (VCLZ) which accepts an input vector C and provides as a result an output vector whose elements respectively correspond to the leading zero count of the elements of input vector C; ii) a vector count trailing zeroes instruction (VCTZ) which accepts an input vector C and provides as a result an output vector whose elements respectively correspond to the trailing zero count of the elements of input vector C; iii) a vector count instruction (VCNT) which accepts an input vector C and provides as a result an output vector whose individual elements respectively correspond to a count of 1s within the individual elements of input vector C; and, iv) a vector parity instruction (VPAR) which accepts an input vector C and provides as a result an output vector whose individual elements respectively correspond to the parity status (odd or even) of the individual elements of input vector C.

Figure 5:
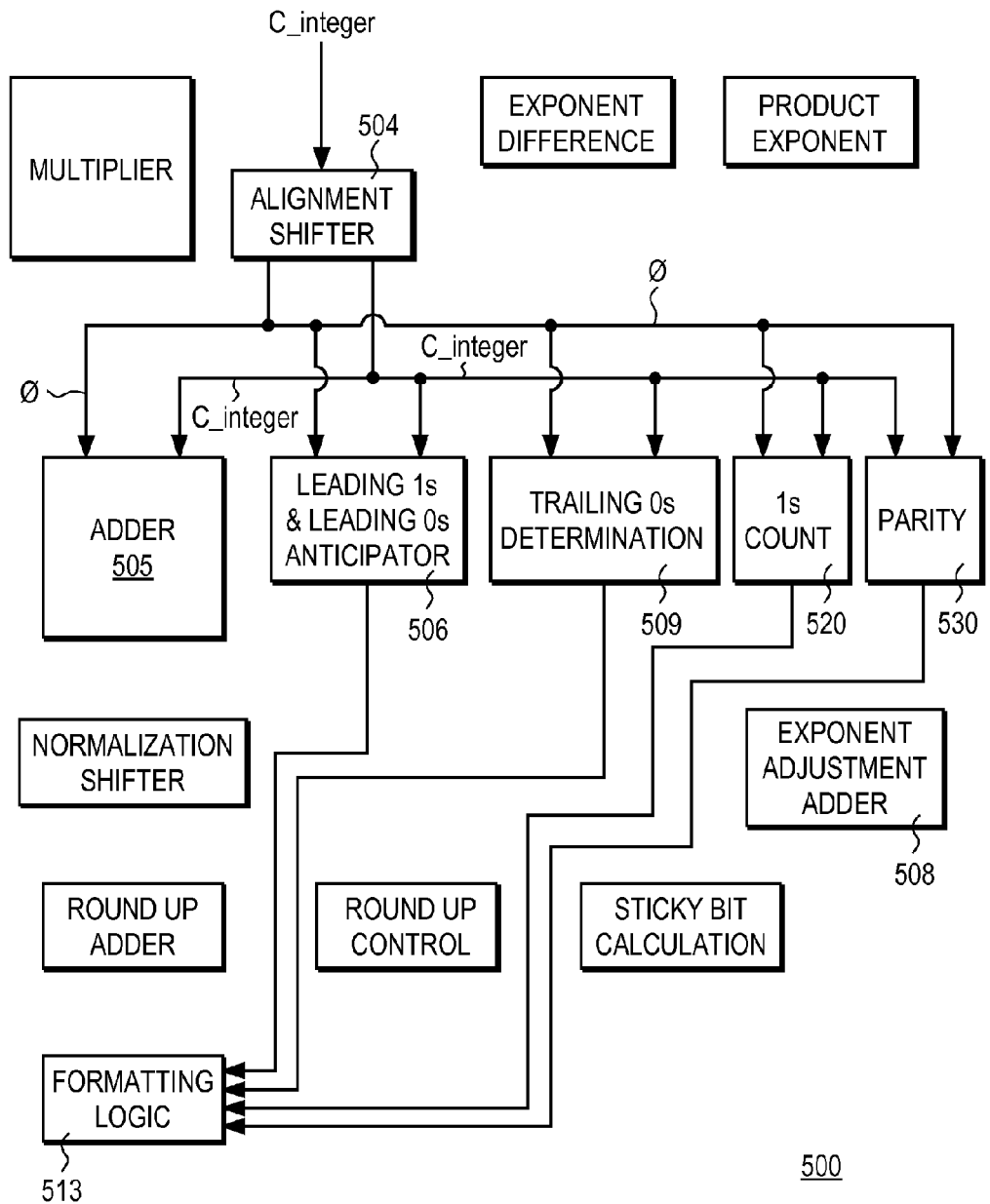
FIG. 5 shows an embodiment of the functional unit of FIG. 3 with extended logic to perform leading zeroes, trailing zeroes, operand 1s count and parity instructions.
Figures 6A, 6B:
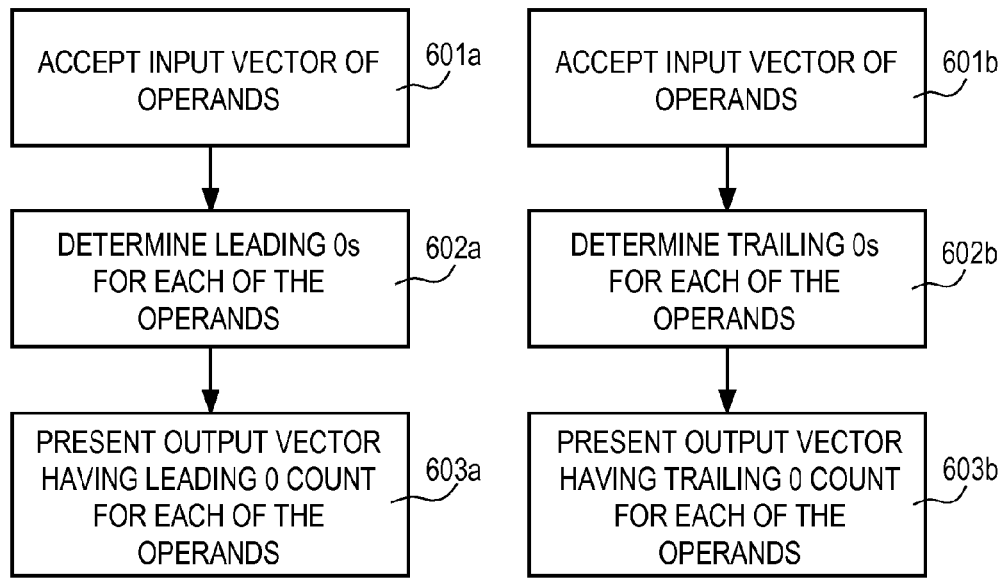
FIGS. 6a through 6d show execution of the following instructions respectively: leading zeroes determination, trailing zeros determination, operand 1s count and operand parity determination.
Figures 6C, 6D:
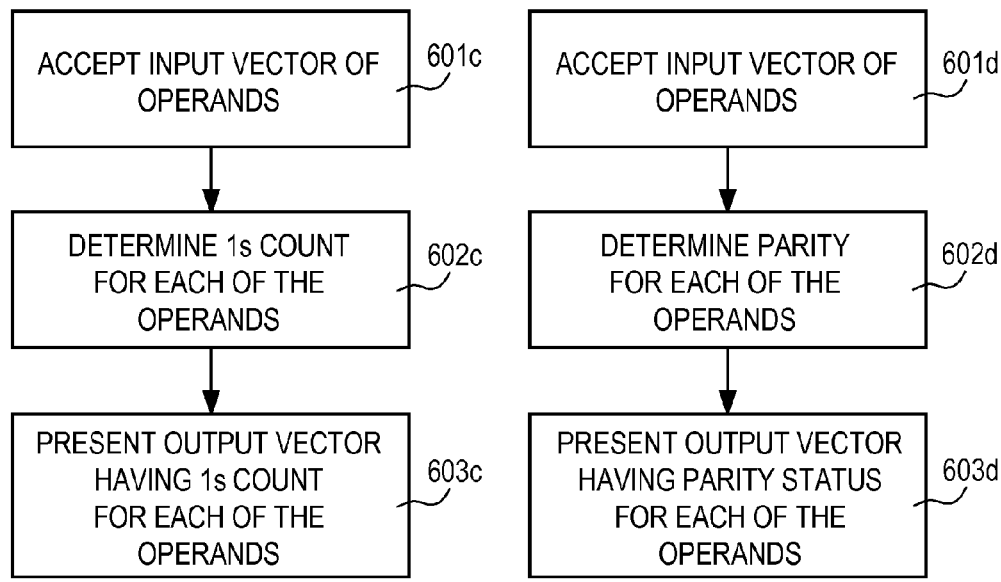

FIG. 5 shows an enhanced functional unit 500 that includes additional logic and wiring above the logic and wiring observed in FIG. 3 to perform a scalar component of the VCLZ, VCTZ, VCNT and VPAR instructions. In an embodiment, with respect to these instructions, the element of the vector that is processed by the functional unit 500 of FIG. 5 is received along the data path that the C operand of the AB+C instruction is received. It should be emphasized that this is only one approach and that the operand for any of the VCLZ, VCTZ, VCNT and VPAR instructions can be received along the data path of any one of the A, B and C operands of the AB+C instruction as a matter of designer choice. For convenience the interconnections between the various logic blocks for executing the VMADD instruction are not shown. It should be understood that such interconnections are present (e.g., as observed in FIG. 3). Of course, any of the blocks observed in both FIGS. 3 and 5 can be implemented with semiconductor logic circuitry.

According to the particular embodiment of FIG. 5, because the operand for any of the VCLZ, VCTZ, VCNT and VPAR instructions is received along the data path of the C operand, the operand is received by alignment shifter 504 (note that any of the "shifters" can be implemented as a shift register). When the instruction specifies any of the VCLZ, VCTZ, VCNT and VPAR instructions—as opposed to a VMADD instruction— alignment shifter ignores and any input from the exponent difference unit 503 and simply presents the C operand to at least the applicable logic for the respective instruction. That is, logic 506 for the VCLZ instruction, logic 509 for the VCTZ instruction, and logic 530 for the VCNT instruction. Additionally the alignment shifter 504 presents a benign value of zero on the datapath that carries the mantissa of the AB term for the VMADD instruction.

With respect to the VCLZ instruction, which presents the leading zero count for the presented operand, comparing FIG. 5 with FIG. 3, note that logic 506 is implemented as a leading 1s and leading 0s anticipator logic circuitry (as opposed to leading 1s anticipator logic circuitry 306 of FIG. 3). Here, note that the number of leading 0s in an operand is related to the position of the leading 1 in an operand. Specifically, for a known bit width operand, the number of leading 0s is equal to the difference between the bit width of the operand and the bit position of the leading 1 in the operand. Recall that, in an embodiment the leading 1s anticipator 306 determines the leading 1 position in both of the AB and C mantissa terms for the VMADD instruction, and, flags the position of the highest ordered (leftmost) leading 1 of these two terms. Here, because the alignment shifter 504 is configured to present a value of 0 for the AB term for the VLCZ instruction, only the leading 1 position of the C term (the operand for the VLCZ instruction) will be flagged. From this, the number of leading zeros for the operand can be determined. Note that different operand bit lengths can be easily handled (e.g., 32 bit or 64 bit) provided the applicable bit length is specified or otherwise known.

Recalling that the leading 1s anticipator 306 of FIG. 3 was deemed an "anticipator" because under certain circumstances its initial answer could be incorrect. Specifically, the output of the adder 305 had to be checked. In the case of the VCLZ instruction, however, the issue does not arise because the adder 305 is not used. As such, the "answer" from logic 506 is correct and does not need to be checked. The leading zero count is then eventually passed to the formatting logic 513 to present the answer in the appropriate format for the instruction. In an embodiment, the leading zero count (like the leading 1s count for the VMADD instruction) is passed to the exponent adjustment adder 508 which forwards it to the formatting logic 513.

With respect to the VCTZ instruction, which presents the trailing zeros count for the input operand, the operand C is passed to the trailing zeroes determination logic 509. Recall from the discussion of FIG. 3 that the trailing zeros determination logic 309 identifies the least significant (rightmost) bit value of 1 in each operand (AB and C) and flags that least significant bit position amongst the two operands as the basis for determining the number of trailing zeroes in the output of adder 305. The same operation applies with respect to the operation of the VCTZ instruction with the added note that the AB term is set to zero so that only the C term (the operand for the VCTZ instruction) controls the final answer provided by the logic 509. The answer is ultimately routed to the formatting logic 513 which presents the answer for the instruction (the answer may be processed beforehand by another block such as the exponent adjustment adder 508).

With respect to the VCNT instruction, 1s count logic 520 counts the number of 1s present in the C operand and the answer is ultimately routed to the formatting logic 513. With respect to the VPAR instruction, parity logic 530 determines the parity value for the C operand (e.g., is there an odd or even number of 1s in the operand) and the answer is ultimately routed to the formatting logic 513 which presents the answer for the instruction.

FIGS. 6a through 6d show the operation of the functional unit 200 of FIG. 2 when the operation described above for the functional unit 500 of FIG. 5 is performed N times in parallel to effect vector operation. For the VCLZ instruction, referring to FIG. 6A, an input vector of operands/elements is accepted 601a, the number of leading 0s in each of the operands is determined 602a and an output vector having the leading 0 count for each of the operands is presented 603a. For the VCTZ instruction, referring to FIG. 6B, an input vector of operands/elements is accepted 601b, the number of trailing 0s in each of the operands is determined 602b and an output vector having the trailing 0 count for each of the operands is presented 603a. For the VCNT instruction, referring to FIG. 6C, an input vector of operands/elements is accepted 601c, the number of 1s in each of the operands is determined 602c and an output vector having the 1s count for each of the operands is presented 603c. For the VPAR instruction, referring to FIG. 6D, an input vector of operands/elements is accepted 601d, the parity of each of the operands is determined 602d and an output vector having the parity for each of the operands is presented 603d.

As discussed above, the functional units discussed above may be implemented within instruction execution units of a semiconductor processor.

Figure 7:
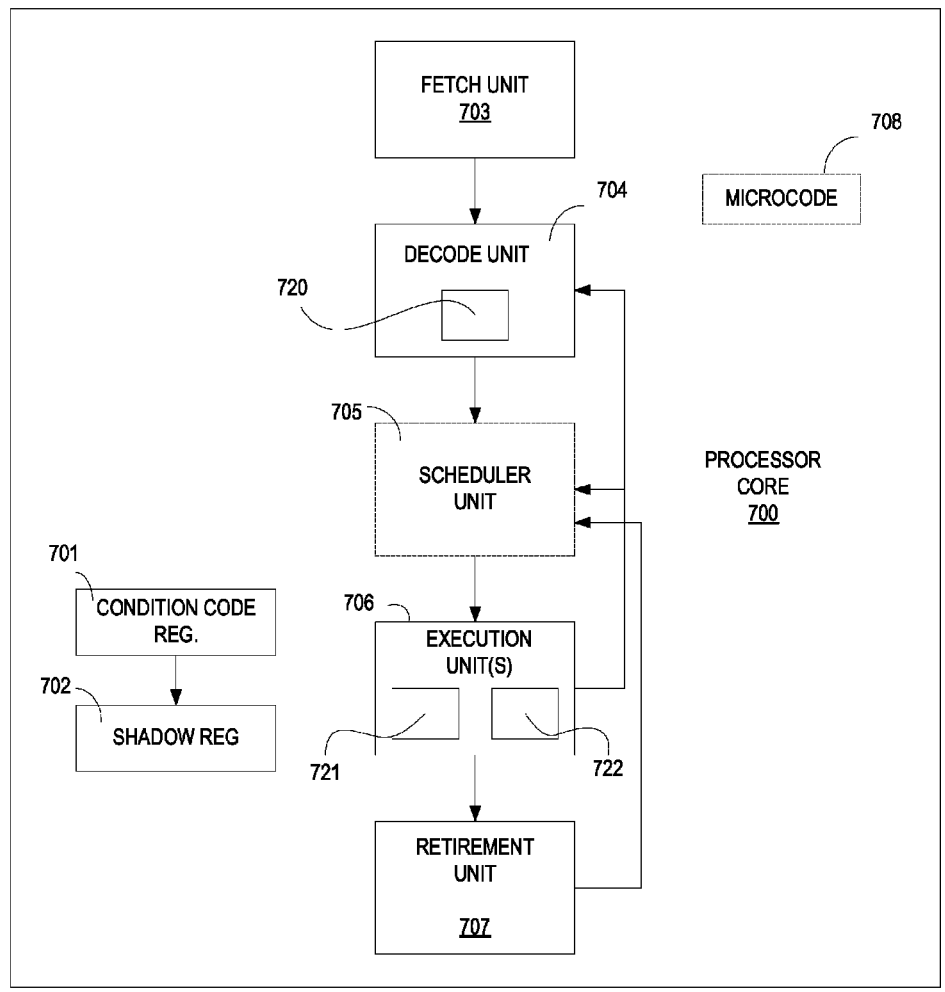
FIG. 7 shows a diagram of a semiconductor processor.

FIG. 7 shows a generic processing core 700 that is believed to describe many different types of processing core architectures such as Complex Instruction Set (CISC), Reduced Instruction Set (RISC) and Very Long Instruction Word (VLIW). The generic processing core 700 of FIG. 7 includes: 1) a fetch unit 703 that fetches instructions (e.g., from cache and/or memory); 2) a decode unit 704 that decodes instructions; 3) a schedule unit 705 that determines the timing and/or order of instruction issuance to the execution units 706 (notably the scheduler is optional); 4) execution units 706 that execute the instructions (typical instruction execution units include branch execution units, integer arithmetic execution units (e.g., ALUs) floating point arithmetic execution units (e.g., FPUs) and memory access execution units); and 5) a retirement unit 707 that signifies successful completion of an instruction. Notably, the processing core 700 may or may not employ microcode 708.

Although the functional units described above show hardwired data paths end-to-end, it is altogether possible that any/all of the processing described above may be implemented with micro-code rather than dedicated logic. In the case of micro-coded processors, the micro-ops are typically stored in a non volatile machine readable medium (such as a Read Only Memory (ROM)) within the semiconductor chip that the processor is constructed on and cause the execution units within the processor to perform the desired function called out by the instruction.

Figure 8:
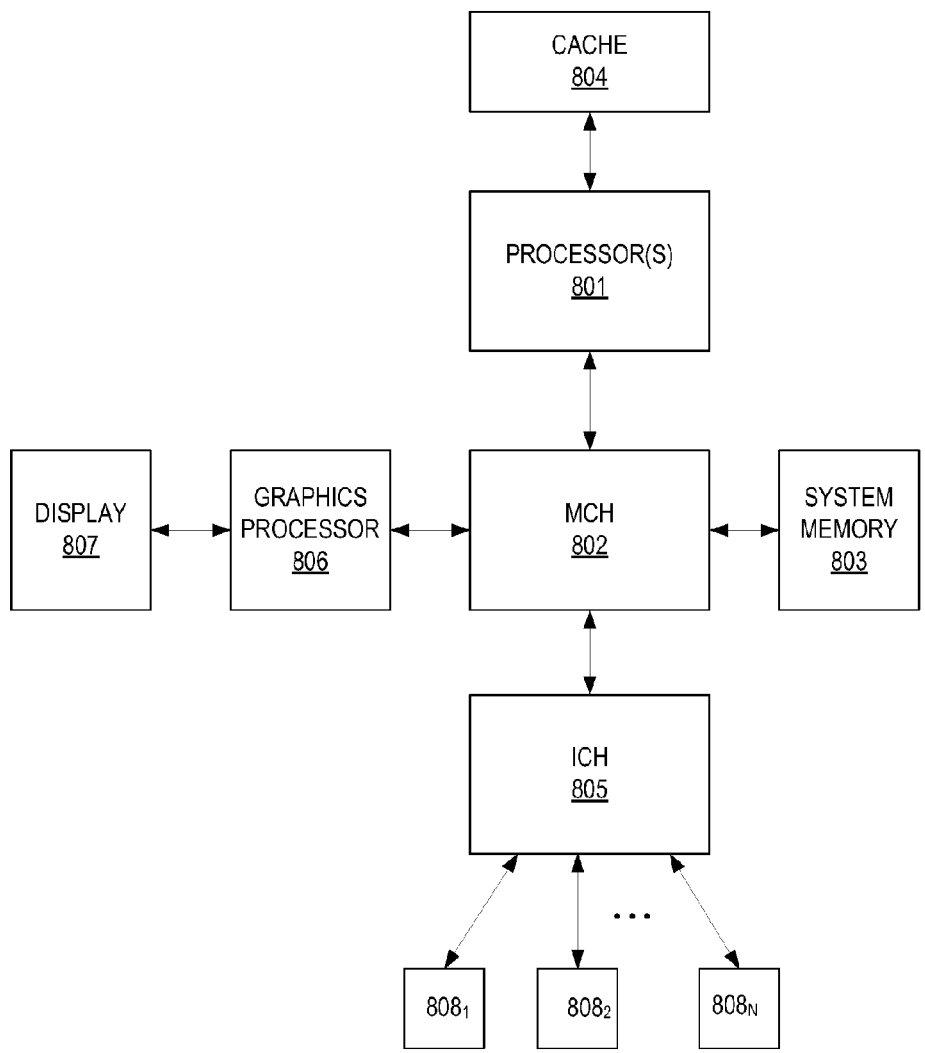
FIG. 8 shows a diagram of a computing system.

A processor having the functionality described above can be implemented into various computing systems as well. FIG. 8 shows an embodiment of a computing system (e.g., a computer). The exemplary computing system of FIG. 8 includes: 1) one or more processors 801 that may be design to include a vector logical reduction instruction; 2) a memory control hub (MCH) 802; 3) a system memory 803 (of which different types exist such as DDR RAM, EDO RAM, etc,); 4) a cache 804; 5) an I/O control hub (ICH) 805; 6) a graphics processor 806; 7) a display/screen 807 (of which different types exist such as Cathode Ray Tube (CRT), flat panel, Thin Film Transistor (TFT), Liquid Crystal Display (LCD), DPL, etc.) one or more I/O devices 808.

The one or more processors 801 execute instructions in order to perform whatever software routines the computing system implements. The instructions frequently involve some sort of operation performed upon data. Both data and instructions are stored in system memory 803 and cache 804. Cache 804 is typically designed to have shorter latency times than system memory 803. For example, cache 804 might be integrated onto the same silicon chip(s) as the processor(s) and/or constructed with faster SRAM cells whilst system memory 803 might be constructed with slower DRAM cells. By tending to store more frequently used instructions and data in the cache 804 as opposed to the system memory 803, the overall performance efficiency of the computing system improves.

System memory 803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 803 prior to their being operated upon by the one or more processor(s) 801 in the implementation of a software program. Similarly, data that a software program determines should be sent from the computing system to an outside entity through one of the computing system interfaces, or stored into an internal storage element, is often temporarily queued in system memory 903 prior to its being transmitted or stored.

The ICH 805 is responsible for ensuring that such data is properly passed between the system memory 803 and its appropriate corresponding computing system interface (and internal storage device if the computing system is so designed). The MCH 802 is responsible for managing the various contending requests for system memory 803 access amongst the processor(s) 801, interfaces and internal storage elements that may proximately arise in time with respect to one another.

One or more I/O devices 808 are also implemented in a typical computing system. I/O devices generally are responsible for transferring data to and/or from the computing system (e.g., a networking adapter); or, for large scale non-volatile storage within the computing system (e.g., hard disk drive). ICH 805 has bi-directional point-to-point links between itself and the observed I/O devices 808.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A vector functional unit implemented on a semiconductor to perform vector operations of dimension N, comprising:
    N functional units, each of the N functional units comprising:
    a multiplier logic circuit and an adder logic circuit to perform a multiply add operation on respective A, B and C operands responsive to a vector multiply add instruction, the A, B and C operands received on respective inputs of the functional unit;
    a leading ones count logic circuit downstream from an alignment shifter circuit that precedes said adder logic circuit, said leading ones count logic circuit to perform a leading ones count operation responsive to the vector multiply add instruction to adjust an exponent value for the vector multiply add instruction; and
    a leading zeros count logic circuit downstream from said alignment shifter circuit to perform a leading zeros count operation on an operand received on one of the respective A, B and C operand inputs, the leading zeros count operation being responsive to a vector leading zeros count instruction.

2. The vector functional unit of claim 1 wherein each of said N functional units further comprise trailing zeros logic circuitry to help perform:
    a vector trailing zeros instruction.

3. The vector functional unit of claim 2 wherein each of said N functional units further comprise parity logic circuitry to help perform:
    a vector parity instruction.

4. The vector functional unit of claim 3 wherein each of said N functional units further comprise 1s count logic circuitry to help perform:
    a vector 1s count instruction.

5. The vector functional unit of claim 1 wherein each of said N functional units are micro-coded.

6. The vector functional unit of claim 1 wherein logic circuitry used to perform a logic calculation for said vector multiply add instruction is also used to perform a logic calculation for said vector leading zeros count instruction.

7. A method, comprising:
    executing vector instructions on a semiconductor chip including executing a first vector instruction with a vector functional unit implemented on said semiconductor chip; and executing a second vector instruction with said vector functional unit, said first vector instruction being a vector multiply add instruction with masking, said second vector instruction being a vector leading zeros count instruction wherein said functional unit uses a leading ones circuit to adjust an exponent value during execution of said vector multiply add instruction, wherein said functional unit also uses a leading zeroes circuit during execution of said vector leading zeros count instruction.

8. The method of claim 7 further comprising executing a third vector instruction with said functional unit, said third vector instruction being a vector trailing zeros count instruction.

9. The method of claim 8 further comprising executing a fourth vector instruction with said functional unit, said fourth vector instruction being a vector parity instruction.

10. The method of claim 8 further comprising executing a fourth vector instruction with said functional unit, said fourth vector instruction being a vector 1s count instruction.

11. The method of claim 7 further comprising performing a logical calculation for said first vector instruction with same logic circuitry that is used to perform a logical calculation for said second vector instruction.

12. The method of claim 11 wherein said logical calculation for said first vector instruction includes a leading 1s determination.

13. A computing system, comprising:
a flat panel display;
a processor implemented on a semiconductor chip, said processor including a vector functional unit to perform vector operations of dimension N, said vector functional unit comprising:
N functional units, each of the N functional units comprising logic circuitry to perform:
a multiplier logic circuit and an adder logic circuit to perform a multiply add operation on respective A, B and C operands responsive to a vector multiply add instruction, the A, B and C operands received on respective inputs of the functional unit;
a leading ones count logic circuit downstream from an alignment shifter circuit that precedes said adder logic circuit, said leading ones count logic circuit to perform a leading ones count operation responsive to the vector multiply add instruction to adjust an exponent value for the vector multiply add instruction; and
a leading zeros count logic circuit downstream from said alignment shifter circuit to perform a leading zeros count operation on an operand received on one of the respective A, B and C operand inputs, the leading zeros count operation being responsive to a vector leading zeros count instruction.

14. The computing system of claim 13 wherein each of said N functional units further comprise logic circuitry to help perform:
a vector trailing zeros count instruction.

15. The computing system of claim 14 wherein each of said N functional units further comprise logic circuitry to help perform:
a vector parity instruction.

16. The computing system of claim 15 wherein each of said N functional units further comprise logic circuitry to help perform:
a vector 1s count instruction.

17. The computing system of claim 13 wherein each of said N functional units are micro-coded.

18. The computing system of claim 13 wherein logic circuitry used to perform a logic calculation for said vector multiply add instruction is also used to perform a logic calculation for said vector leading zeros count instruction.

19. A semiconductor chip, comprising:
a functional unit to perform operations on elements of vectors to support execution of more than one vector instruction, said functional unit including:
a multiplier logic circuit and an adder logic circuit to perform a multiply add operation on respective A, B and C operands responsive to a vector multiply add instruction, the A, B and C operands received on respective inputs of the functional unit;
a leading ones count logic circuit downstream from an alignment shifter circuit that precedes said adder logic circuit, said leading ones count logic circuit to perform a leading ones count operation responsive to the vector multiply add instruction to adjust an exponent value for the vector multiply add instruction; and
a leading zeros count logic circuit downstream from said alignment shifter circuit to perform a leading zeros count operation on an operand received on one of the respective A, B and C operand inputs, the leading zeros count operation being responsive to a vector leading zeros count instruction.

* * * * *